(12) United States Patent
Wu

(10) Patent No.: US 9,002,943 B2
(45) Date of Patent: Apr. 7, 2015

(54) SUBSCRIPTION-BASED DYNAMIC CONTENT OPTIMIZATION

(71) Applicant: Mobila, Inc., Thousand Oaks, CA (US)

(72) Inventor: On Hung Wu, Quebec (CA)

(73) Assignee: Mobila, Inc., Thousand Oaks, CA (US)

( * ) Notice: Subject to any disclaimer, the term of this patent is extended or adjusted under 35 U.S.C. 154(b) by 0 days.

(21) Appl. No.: 14/054,663

(22) Filed: Oct. 15, 2013

(65) Prior Publication Data

US 2014/0108675 A1 Apr. 17, 2014

Related U.S. Application Data

(63) Continuation of application No. 12/757,838, filed on Apr. 9, 2010, now Pat. No. 8,560,731.

(51) Int. Cl.
*H04L 29/06* (2006.01)
*G06F 17/22* (2006.01)
*G06F 17/30* (2006.01)

(52) U.S. Cl.
CPC .............. *H04L 65/60* (2013.01); *G06F 17/227* (2013.01); *G06F 17/30905* (2013.01); *G06F 17/2247* (2013.01)

(58) Field of Classification Search
CPC ................................ H04L 41/00; H04L 61/00
USPC .......................................... 709/246; 715/234
See application file for complete search history.

(56) References Cited

U.S. PATENT DOCUMENTS

| | | | | |
|---|---|---|---|---|
| 7,062,709 | B2* | 6/2006 | Cheung | 715/234 |
| 7,284,239 | B1* | 10/2007 | Young et al. | 717/137 |
| 2002/0065842 | A1* | 5/2002 | Takagi et al. | 707/500 |
| 2004/0205731 | A1* | 10/2004 | Junkermann | 717/136 |
| 2008/0281578 | A1* | 11/2008 | Kumaran et al. | 704/2 |

OTHER PUBLICATIONS

"The Document Object Model"—Dr. Tony Pittarese, ETSU, Computer & Information Sciences Dept., Oct. 2009 http://einstein.etsu.edu/~pittares/podcast/slides/Fall2009/08--Document%20Object%20Model%20(DOM).pdf.*

* cited by examiner

*Primary Examiner* — Randy Scott
(74) *Attorney, Agent, or Firm* — Mintz Levin Cohn Ferris Glovsky and Popeo, P.C.

(57) ABSTRACT

Content is received from a content source that is to be converted and provided to a subscriber. The subscriber is then associated with a document object model and rules for transforming the content according to the document object model. The content is mapped to the document object model using the rules to result in modified content so that the modified content can be provided to the subscriber. In one arrangement, an accompanying architecture includes a mobile device, an intelligent content gateway server (or group of servers), and one or more remote content sources. Related apparatus, systems, techniques and articles are also described.

23 Claims, 3 Drawing Sheets

SUBSCRIPTION-BASED DYNAMIC CONTENT OPTIMIZATION

CROSS REFERENCE TO RELATED APPLICATION

This application is a Continuation of patent application Ser. No. 12/757,838, filed on Apr. 9, 2010, now U.S. Pat. No. 8,560,731 issuing on Oct. 15, 2013 entitled "Subscription-Based Dynamic Content Optimization", the contents of which are hereby fully incorporated by reference.

TECHNICAL FIELD

The subject matter described herein relates to subscription-based dynamic optimization of content delivery.

BACKGROUND

Websites and other content sources are adopting increasingly rich media using different development platforms. At the same time, there is dramatic growth in the number and variety of mobile devices such as BLACKBERRY phones, IPHONE phones, IPAD slate computers, and the like which all have different browsing interfaces for accessing such content. While some content sources may have differing versions which are intended of such mobile device platforms, other content sources adopt a single version which does not guarantee usability in all cases. In either event, users desire the ability to customize the manner in which content is conveyed to them based on their particular preferences and based on their particular mobile device.

SUMMARY

In a first aspect, content from a content source to be converted is received. Such content conversion is associated with a subscriber. Thereafter, the subscriber is associated with a document object model and rules for transforming the content according to the document object model. The content is mapped to the document object model using the rules to result in modified content so that provision of the modified content (e.g., rendered, transmitted, stored, etc.) to the subscriber can be initiated.

The associating can include polling a remote database with an identification of the subscriber to obtain a user profile for the subscriber (and such user profile can in some implementations includes the document object model and the rules—while in other arrangements pattern matching can be used to find a suitable document object model). Initiating provision of the modified content can comprise converting the modified content into HTML and transmitting the HTML to a remote system associated with the subscriber.

In another aspect, a mobile device can be coupled to a gateway server which in turn can be coupled to one or more content servers (all of which are separate and remote from each other and are embodied by one or more computing systems). The gateway server can receive from the mobile device a first request to retrieve content from a content server, the request identifying a subscriber using a mobile device. The gateway server can transmit a second request to a content server retrieve the content from the content server. Thereafter, the gateway server receives the content from the content server so that such content can be parsed (either by the gateway server or a server coupled to the gateway server such as a customization server) by deconstructing the content and mapping the deconstructed content to a first document object model, and transforming the mapped content according to the plurality of rules defined in the user profile to generate a second document object model. Thereafter, the transformed content is transmitted by the gateway server to the mobile device.

The document object model can be pre-defined by the subscriber. In other variations, the document object model can be selected among a plurality of document object models utilized by a plurality of other subscribers (with such selection being based on the most-frequently used document object model—e.g., "the most popular way"). Alternatively, the document object model can be selected based on pattern matching with the particular content to pre-defined document object models.

The user profiles can defines one or more of: an identity of the subscriber, a native language for the subscriber, a type and brand of mobile device, a content processing capability of the mobile device and associated applications installed on the mobile device, a subscriber-defined layout, subscriber-defined blocking rules defining content to be blocked from being displayed on the mobile device, the document object model and the information mapping rules that are used to re-organize and reformat content from web sites pre-defined by the subscriber, and performance of a network utilized by the mobile device.

Transforming the content according to the second document object model can comprise one or more of: scaling images with respect to a pre-defined ratio in the document object model, formatting text with respect to a subscriber-defined text display preference in the document object model, translating a language of text into to a subscriber-defined language preference in the document object model, and optimizing the content layout horizontally or vertically as defined in the document object model. Transforming the content according to the second document object model can alternatively or additionally include: removing or converting at least a portion of the content based on applications currently being executed on the mobile device other than a browser rendering the modified content.

Transforming the content can include associating the mobile device with a country, executing pattern recognition to determine a pattern most closely matching the mobile device and country, the pattern having associated rules, and using the rules to transform the mapped content. In addition, or in the alternative, transforming the content can include: tagging the modified content to avoid further modification by any intervening servers and/or transcoders between the mobile device and the gateway server.

Associating the identified subscriber with a corresponding user profile can comprise polling a remote repository with identification information characterizing the subscriber to obtain the user profile. The user profile can include the second document object model.

Each document object model comprises a plurality of hierarchically arranged nodes. Semantic interpretation can be executed to identify a content type associated with each node. The semantic interpretation can comprise syntactic pattern recognition. If the rules specify that content associated with a particular node is to be blocked, then the corresponding node can be removed from the document object model. Children nodes of the removed node can be relocated to depend from a different node.

In another aspect, content can be received from a content source to be converted, the conversion being associated with a subscriber. The content can be deconstructed according to a first document object model. The user can be associated with a second document object model as well as rules for transforming the content according to the second document object model. Thereafter, the content can be transformed from the first document object model to the second document object model using the rules to result in modified content so that provision of the modified content to the subscriber can be initiated.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

As can be appreciated by the foregoing, subscribers have at least four options to download content through the ICG. First, the mobile device can view unedited content. There is no concept of DOM in this option, the content extracted from the content provider is sent to the subscriber directly. Second, the content can be presented on the mobile device as per user-defined rules. The subscriber can define the view of content for a set of his/her favorite sites like FACEBOOK. When ICG receives the URL of these sites, ICG retrieve the content from the content provider and the user-defined view (is defined in terms a specific DOM and mapping rules per favorite site) that is stored as part of user profile. ICG creates a new DOM based on the user-defined view with the latest information extracted from the content provided by the content provider, and then transforms the new DOM into HTML and sends to the subscriber. Third, content can be viewed according to the most popular view. With this arrangement, the subscriber selects "the most popular view" to download the content. This option is only feasible when "the most popular view" is available to the selected sites. When ICG receives the URL of these sites, ICG retrieve the content from the content provider and "the most popular view" (is defined in terms a specific DOM and mapping rules per favorite site) that is stored in a central repository of ICG. ICG creates a new DOM based on "the most popular view" with the latest information extracted from the content provided by the content provider, and then transforms the new DOM to HTML and sends to the subscriber. Fourth, content to be displayed on the mobile device can be optimized and customized by ICG such that ICG retrieves content from the content provider based on the requested URL and the user profile from a central repository of or coupled to ICG. The content is firstly converted into a DOM structure. Semantic interpretation is applied to the structure to identify the content items (or nodes) that are relevant to optimization and customization. Pattern recognition is applied to find the closest DOM structure and the associated mapping rules that are predefined inside ICG. A pre-defined DOM is always able to find with the concept of "closest matching", and not "exact matching". With the identification of the closest DOM and the associated information mapping rules, ICG creates a new DOM with the latest information extracted from the content provided by the content provider. ICG then applies the customization and optimization criteria defined inside the user profile to the new DOM, and transforms the new DOM to HTML and sends to the subscriber.

The subject matter described herein provides many advantages. ICG provides subscribers with the platform and ownership to customize the downloading of the content to their mobile devices, and share the way to optimize the content with the others. The capability of ICG is evolving with the participation from the subscribers, and deliver content to the subscribers optimized at the personal level that has not been previously realized.

ICG is also advantageous in that it enables user-driven content customization, extended options for content browsing, and evolving capability with subscribers' ownership. With regard to user-driven customization, with the ICG, content is customizable at the user level. This means users make the decision on the type of content that will be generated as well as the way it is to be displayed on their devices. The user can block contents like advertisements, banners, logos, or any images that have more than a preset size limit for such contents. Users can also enforce the content to be packaged with respect to their preference. The mobile device users have the right and capability to choose the content they want. This is particularly important when they have to pay for the number of bytes downloaded to their devices such as the case of many mobile devices.

The current subject matter allows subscribers to be presented with more options to view the same content compared to traditional transcoder. For each content request, an ICG subscriber has the freedom to chose the following ways to view the content: (i) define his/her own way to view the content, (ii) use "the most popular way" to view the content, (iii) allow ICG define the optimal way to view the content based on his/her user profile, and (iv) view the content unedited.

Furthermore, by letting subscribers to define the way to optimize the content as well as creating "the most popular way" to view the content by the subscribers, ICG is walking away from the approach of one algorithm fit all that is operated by the other transcoders. In addition, subscribers are invited to participate to guide the content optimization as well as defining their own way to view to content. This approach creates subscriber's ownership to the ongoing development of ICG. With new rules for content transformation introduced by subscribers, ICG is evolving to optimize and customize content constantly.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
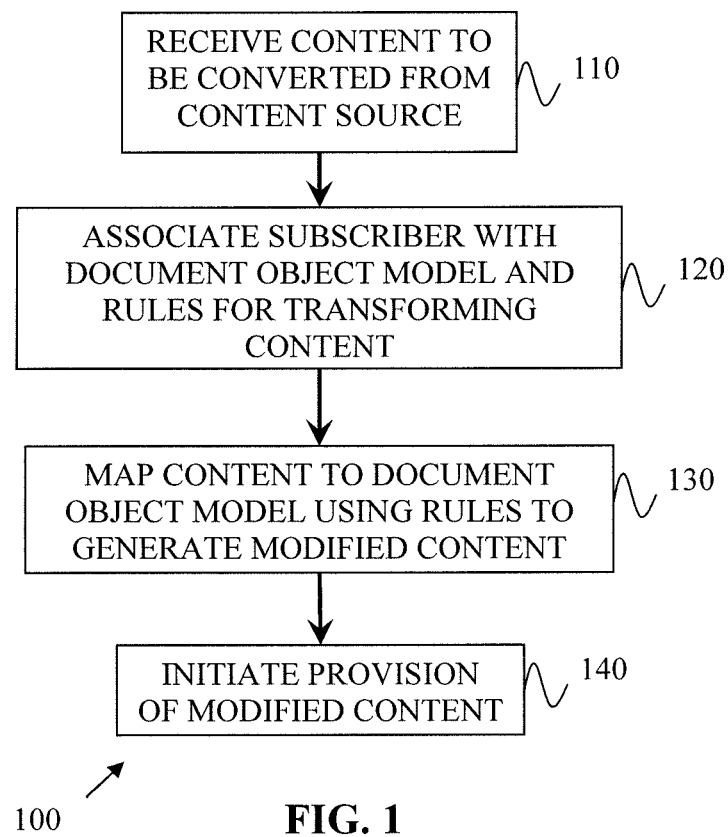
FIG. 1 is a process flow diagram illustrating an architecture agnostic method for transforming content.

FIG. 1 is a process flow diagram illustrating a method 100, in which, at 110, content that is to be converted is received. Such conversion is intended or otherwise associated with a subscriber. Thereafter, the subscriber is, at 120, associated with a document object model and rules for the transforming the content according to the document object model. Such associated may be accomplished, for example, by polling a remote database with the identity of the subscriber (which may have previously been obtained). The content is mapped, at 130, to the document object model using the rules in order to result in modified content. Provision (e.g., transmission, display, persistence, etc.) of the modified content is, at 140, subsequently initiated.

Implementations of the subject matter described herein are sometimes referred to as Intelligent Content Gateway (ICG). ICG dynamically derives content from Internet sources (e.g., web pages) and reformulates the content so it can be efficiently displayed on browser-based devices of various screen configurations. It can be operated in a subscriber-based model using the network to exchange information. There can be a user profile defined for each registered subscriber of ICG. The user profile can, for example, define the type and brand of the browser-based device that is being used, the capability of the device in terms of applications installed, as well as other user preferences. Based on the content request from a browser-based device, ICG retrieves the content from the sources and then dynamically organizes and reformats (hereinafter referred to as "editing") the content in real time to meet the requirements and constraints of the user's profile.

The editing may include but is not limited to language translation, indexing, reorganization, reformatting, changing content layout, resizing the media files embedded inside the content, and content filtering with respect to the user preference defined in the user profile. In addition, subscribers are provided with tools (e.g., wizard interface, etc.) to define the rules that are used to re-organize and reformat content from their favor web sites. ICG compiles these rules statistically and defines "the most popular way" to view the content of these sites. Subscribers can be provided with the option to view the content in "the most popular way".

Artificial intelligence (AI) techniques can be used to perform the editing function. The resulting edited content can then be sent to the browser-based device for display. Mechanisms can be provided to enable the user to provide feedback about the quality of resulting content. For example, a graphical user interface element can be rendered on a particular page, which when activated, either characterizes the quality of the displayed content (e.g., good/bad, etc.) or results in another. In some implementations, an AI engine can use the feedback from the user to refine its editing process to produce correspondingly customized results from then onwards.

The source of the content (referred as "content source") can from the domain of the public Internet or from proprietary content sources with access right granted for ICG. The browser-based device includes but is not limited to any hardware or software that is capable of hosting a browser-like internet web browser, which includes desktop and laptop computers, net books, smart phones like Apple's IPHONE and IPAD platforms, BLACKBERRY devices, PALM platforms TV, etc.

ICG is predominantly described as being hosted on centralized computer servers but can run on any kind of computer configuration that is capable of running the software. The communication between the browser-based devices and ICG, as well as between ICG and content sources can be through wireless, optical, and wire line networks.

ICG can provide a registered user with a portal to request content by entering the URL (Universal Resource Locator) associated to the content. The portal is referred as ICG portal. The URL uniquely identifies the content at the content source. The layout of the ICG portal is customized with respect to the user profile of each registered user in terms of bookmarks, content request history, and links to favored content sites. ICG is developed as a proxy server between the mobile users and the content providers. Based on the content request from mobile users, ICG retrieves the content from the content providers, and customizes and optimizes the content with respect to the user profiles of the mobile users. Content is presented as a variant of well-formed HTML and is composed of static and dynamic objects. Content associated with static object does not vary while the ones with dynamic object vary with procedures that provide the update. With the content from content provider, ICG firstly converts the well-formed HTML content into a variant of Document Object Model (DOM). The DOM is a tree like structure with a unique root and a hierarchy of objects encapsulated in a set of parent and child relationship. If the HTML comes with schema or DTD, ICG will retrieve them as well and will be used in semantic interpretation of the objects inside the DOM.

ICG is operated in a subscriber-based model. Only registered users are allowed to use ICG to download content. The user profile is created for each user through a browser-based device during registration. The user's profile can contain and/or characterize items such as: the identity of the user, the native language of the user, the type and/or brand of the device rendering the content (e.g., rendering on a browser), the capability of the device in terms of the applications installed at the device relevant to content processing with the browser, the layout of the user's ICG portal, the user preference in terms of blocking rules and display style, communications-network performance (i.e., bandwidth rate), type of network (2G, 3G, 4G, EDGE, IPTV, etc.), the document object models and rules that are used to re-organize and reformat content from the subscriber's favorite web sites, and whether the user prefers to maintain content that has already been optimized or whether the user prefers to use "the most popular way" to view the content (i.e., user settings that have been widely adopted for certain content can be utilized, etc.). Blocking rules can define the content that should be blocked such as advertisements. Display style can be defined in terms of re-formatting the content and restructuring the layout, image scaling ratio, and preferred text format.

The user's profile can be stored in ICG. Registered users of ICG can be allowed to modify their profiles. When modified, the updated profile can be used for the next content request. With respect to the content request, the ICG will first download the content from the content source and then ICG applies the editing to the content in real time.

Subscribers can be provided with one or more tools (e.g., wizard interfaces, etc.) to define rules that can be used to re-organize and reformat content from content sources (e.g., websites, etc.). The rules can include the selection as well as blocking of specific content from the content source, the location of the content to be displayed, and the associated format. The rules can be stored, as part of user profile (or alternatively the user profile can be associated with one of a plurality of rule sets based on user clustering) and ICG can use the rule sets to edit the content for future download. If the layout of a particular content sources (e.g., website) is changed beyond a certain pre-defined level (i.e., a site has a new layout schema, etc.), ICG can prompt the subscriber to redefine the rules.

ICG can collect the rules per web site defined by the subscribers and consolidate them as a mean to edit content for the corresponding site. Consolidation can be carried out for each content source by grouping/clustering the most common set of "non-conflicting" rules for reorganizing the content from the subscribers. The result can be defined as "the most popular way" to view the content for each site.

For each content request, the subscriber can select options to view the content including, for example: the subscriber's specified manner in which to view the content, the most popular way to view the content, an optimal manner based on the user's profile (for situations in which the user has not specifically described a manner in which to view the content source, etc.), and to view the content unedited (in all circumstances or in circumstances when it is determined that the content has already been edited/modified).

ICG can include an AI engine that carries out content editing. The editing can include one or more of the following actions depending on the user profile: language translation if the language inside the content is other than the user's native language, removal of items/objects within the content if triggered by blocking rules defined in user preference, conversion of format such that it can be processed by the mobile device if the original format cannot be processed, restructure of layout and/or format of content in accordance with user preferences, restructure of layout and/or format of content in order to optimize the display of the content and the navigation capability at the mobile device, introduction of domain knowledge with respect to the primary target audience of the content to assist with user-driven restructuring of the content (e.g., using sport's domain knowledge to restructure a sport's report, etc.), resizing of images with respect to the display resolution of the device, repackaging content to minimize bandwidth consumption when it is delivered to the device (this may, for example, result in only some of the content being sent to the device and the remaining of the content being sent to the device depending upon further action from the user), and GUI controls (e.g., buttons, menus, etc.) can be introduced as part of repackaging process to link the edited content when the original content is segmented into multiple parts with the new layout.

In cases in which the subscriber has already defined his/her own way to view the content, a DOM encapsulated his/her view of this content (referred to herein as a user-defined DOM) and a set of mapping rules are stored inside the user profile. The mapping rules can be used to synchronize the content between the user-defined DOM and the DOM derived from the content of the content provider. ICG generates the DOM with the latest content from the user-defined DOM, the mapping rules, and the DOM from the content provider in real time. The newly generated DOM can be converted into a format such HTML and then sent to the mobile device.

The option of using "the most popular way" to download content is only feasible if "the most popular way" is available to the selected sites. Similar to user-defined DOM, a set of DOM and mapping rules can be defined for each of "the most popular way" of viewing content. Such information can be stored in a central repository of ICG indexed, for example, by the URL of the content request. The process of generating of the DOM with the latest content and the corresponding HTML is similar to the one of using user-defined DOM.

In the case of having content customized by ICG, once the DOM of the content is constructed, semantic interpretation can be applied to each object or node of the DOM tree by identifying content that is stored therein. Semantic interpretation can be executed to assign "content type" for each node of the DOM tree that is relevant to content customization with the user profile. Syntactic pattern recognition can be used in semantic interpretation to identify the "content type" like "advertisement" based on the attributes associated with the nodes, the accompanied style guide, keywords, and context.

ICG can use one or more of the following rules to optimize the content based on the user profile: scaling images with respect to user-defined ratios/sizes, formatting text based on user-defined preferences (e.g., size, location, font, etc.), optimizing content layout horizontally or vertically, removal and/or conversion of certain types of content based on user-preferences and/or applications executing (or resident) on the mobile device other than the browser, modification of content based on country and domain, modification of content based on mobile device (especially if the subscriber has multiple mobile devices) (pattern recognition can be executed to identify the closest pattern and then determine the associated rules for editing the content), adding further patterns and rules based on feedback from users, and classification of items within content (e.g., logos, advertisements) to enable further processing such as removal.

In some implementations, the edited content can be tagged (e.g., tagged with <OPT>) to avoid further reformatting by the underlying communications network (e.g., a transcoder of a telecom service provider).

The editing of ICG can comply with the guidelines produced by Content Transformation Task Force within W3C.

When the content object of a node should be filtered due to the situation that the content is either unsupported by the capability of the mobile device or identified in the blocking rules, the corresponding node removed from the DOM tree and its children nodes will be relocated accordingly. Language translation, image scaling, and text reformatting can be applied on the content object of each node as enforced by user preference as specified by the user profile.

Syntactic pattern recognition can be executed to identify the closest DOM tree from a set of pre-defined ones and the associated information mapping rules that are stored inside ICG as the baseline for content restructuring. A pre-defined DOM is always able to find when the pattern recognition searches for the closest match and not the exact match. A number of DOM trees are pre-defined for each mobile device, content optimization preference (e.g., clustered optimization preferences), and domain. Each pre-defined DOM can have a set of restructuring rules for content optimization. Content restructuring can be accomplished, for example, by re-arranging the parent and child relationship among the content nodes inside the DOM tree, adding and deleting nodes between parent and child, and breaking a single DOM tree into multiple ones. Syntactic pattern recognition can be used to identify the closest pre-defined DOM tree, then the associated rules (from the user profile) are used to restructure the DOM. ICG can then convert the restructured DOM tree into HTML and send same to the mobile device.

Mechanisms can be put in place for the user to optionally provide feedback on the final content presented to them. This information, when provided, can be used by the AI engine to produce more tailored results to the user the next time content of a similar nature is requested.

ICG can provide caching of content that is static and does not contain dynamic elements. The caching can be stored per model of mobile device. For all other dynamic content, ICG can download the original URL content for each request, edit such content appropriately, and then send the edited content to the requesting mobile device.

ICG can be composed of an array of servers. An ICG core server can serve as the dispatch of content request and provide a single point of coordination among different ICG servers, the mobile users, and the content servers. An ICG content customization server can execute the pattern recognition, content customization, and optimization techniques described herein. An ICG subscriber server can host subscriber profiles and user-defined document object models. An ICG global server can host the DOM and rules of "the most popular view" content (for users without profiles and/or users selecting the most popular view as part of their profile). An ICG cache server can host the cache content. It will be appreciated that the functionality provided by each of these servers can be provided by fewer servers (including a single server) depending on the desired implementation.

Figure 2:
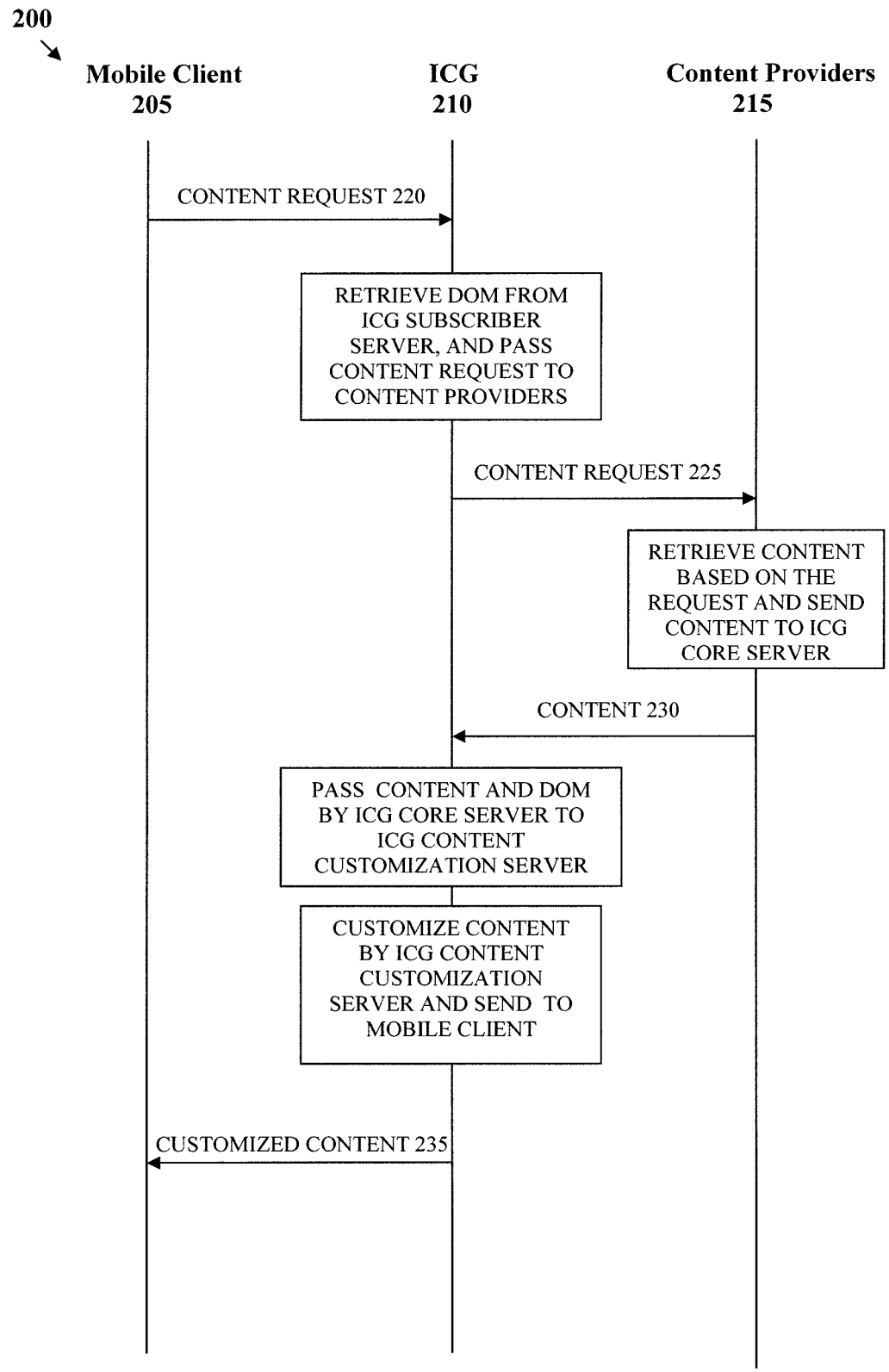
FIG. 2 is a signaling diagram illustrating an exemplary architecture including an Intelligent Content Gateway.

FIG. 2 is a diagram 200 that illustrates a sample signaling between a mobile client 205, an Intelligent Content Gateway 210 (which may consist of one of or many connected servers), and a content provider 215. The mobile client 205 transmits a first request 220 for content which is received by ICG 210. In some implementations an ICG core server retrieves a corresponding document object model from an ICG subscriber server. The document object model may either be specifically associated with the subscriber using the mobile client 205 or it may be a default or "popular" document object model that is not specifically associated with the subscriber. Subsequently, a second request 225 is transmitted by ICG 205 to the content provider 215. At this time, the content provider 215 retrieves the content specified in the second request 225 and sends the content 230 to the ICG 210 (e.g., the ICG core server). ICG 210 parses the content and the document object model to an ICG content customization server in cases in which the subscriber has selected to view the content with his/her predefined view or through "the most popular way". In case in which the subscriber arranges his or her profile settings to allow the ICG to optimize and customize the content with the user profile, ICG parses only the content to an ICG content customization server. Then ICG content customization server applies pattern recognition to select a document object model from a pre-defined set of document object models ICG that is the closest to the one from the provider. The selected document object model comes with a set of information mapping rules (which are used to map the content to such document object model). The ICG content customization server customizes the content by transforming the content according to the document object model using mapping rules either associated with the subscriber or associated with the document object model. The customized content 235 is then transmitted to the mobile client 205 for rendering/display. In arrangements in which the content is not to be edited, ICG 210 simply acts as a proxy and does not modify or otherwise transform the content. In addition, in some implementations ICG 210 may have previously cached relevant content (e.g., in a ICG cache server, etc.) such that it is not necessary to poll the content provider 215 to retrieve the content.

Figure 3:
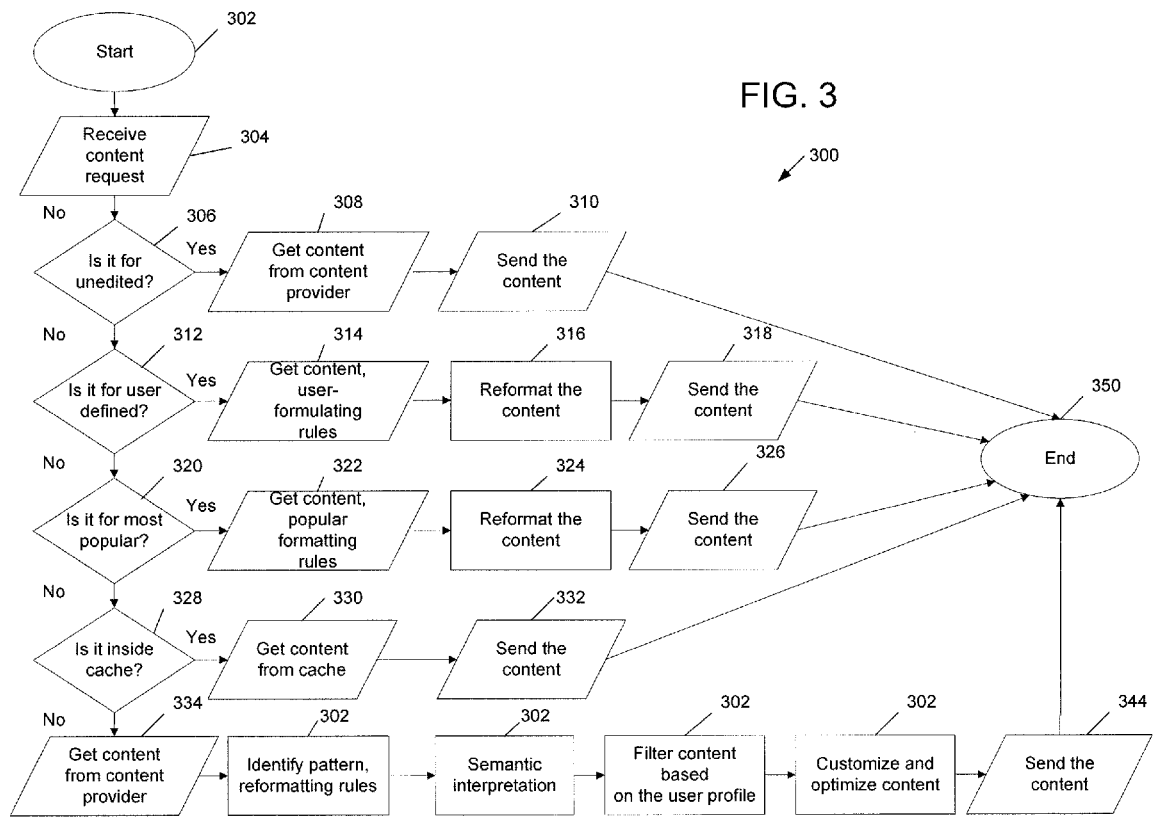
FIG. 3 is a process flow diagram illustrating a decision process for serving content to a subscriber.

FIG. 3 is a diagram 300 illustrating high-level decision process for serving content to the subscriber. The process begins at 302 and terminates at 350. At 304, a content request is received. It is then determined, at 306, whether the request is for unedited content. If the request is for unedited content, then at 308, the content is retrieved from the content provider, and at 310, the content is sent to the requesting device. If the request is not for unedited content, it is determined, at 312, whether the content is to be modified based on user-defined preferences. If the content is to be modified based on user-defined preferences, at 314, the content is retrieved as well as user-defined formatting rules, the content is reformatted at 316 according to such rules, and then the content, at 318 is sent to the requesting device. If it is determined that the content is not to be modified using user-defined preferences, then it is determined, at 320 whether the request is for "most popular way" and/or default manner for transforming the content. If that is the case, then at 322, content as well as most popular formatting rules are obtained, the content is, at 324, accordingly reformatted, and at 326, the reformatted content is transmitted to the requesting device. If the request for content was not for the "most popular way", then it is determined, at 328, whether the requested content is cached (e.g., at the ICG or at a server different than the content provider). If the content has been cached (and possibly already reformatted), then at 330, the content is obtained from the cache and, at 332, the content is sent. Lastly, if it is determined, that no specific rules have been associated with the content specified in the request, then the content is, at 334, obtained from the content provider. Thereafter, at 336, pattern and reformatting rules are identified for content and at, 338, the content is semantically interpreted. Content is filtered, at 340, based on preferences specified in the user profile so that, at 342, content can be customized and optimized so that, at 344, the content can be sent to the requesting device.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
receiving content from a content source to be converted, the conversion being associated with a subscriber;
associating the subscriber with a document object model and rules for transforming the content according to the document object model, the document object model being one of a plurality of different document object models and the rules comprising rules from one of a plurality of different rule sets, the associating comprising polling a remote database with an identification of the subscriber to obtain a user profile for the subscriber, the user profile comprising the document object model and the rules;
mapping the content to the document object model using the rules to result in modified content; and
initiating provision of the modified content to the subscriber.

2. A method as in claim 1, wherein initiating provision of the modified content comprises: converting the modified content into HTML and transmitting the HTML to a remote system associated with the subscriber.

3. A method as in claim 1, wherein initiating provision comprises one or more of: transmitting the modified content, displaying the modified content, and persisting the modified content.

4. A computer-implemented method comprising:
receiving, by a gateway server from a mobile device, a first request to retrieve content from a content server, the request identifying a subscriber using a mobile device, the mobile device, the gateway server, and the content server all being remote and separate from each other;
associating, by the gateway server, the identified subscriber with a corresponding user profile, the user profile providing a plurality of rules that define how content is to be displayed;
transmitting, by the gateway server to the content server, a second request to retrieve the content from the content server;
receiving, by the gateway server, the content from the content server;
parsing the content by:
deconstructing the content and mapping the deconstructed content to a first document object model, and transforming the mapped content according to the plurality of rules defined in the user profile to generate a second document object model; and
transmitting, by the gateway server to the mobile device, the transformed content for rendering on the mobile device.

5. A method as in claim 4, wherein the parsing is performed by the gateway server.

6. A method as in claim 4, wherein the parsing is performed by a customization server coupled to the gateway server.

7. A method as in claim 4, wherein the second document object model is pre-defined by the subscriber.

8. A method as in claim 4, wherein the second document object model is selected among a plurality of document object models utilized by a plurality of other subscribers, the selection being based on the most-frequently used document object model.

9. A method as in claim 4, wherein the user profiles defines one or more of: an identity of the subscriber, a native language for the subscriber, a type and brand of mobile device, a content processing capability of the mobile device and associated applications installed on the mobile device, a subscriber-defined layout, subscriber-defined blocking rules defining content to be blocked from being displayed on the mobile device, the document object model and the information mapping rules that are used to re-organize and reformat content from web sites pre-defined by the subscriber, and performance of a network utilized by the mobile device.

10. A method as in claim 4, wherein transforming the content comprises one or more of: scaling images with respect to a pre-defined ratio in the document object model, formatting text with respect to a subscriber-defined text display preference in the document object model, translating a language of text into to a subscriber-defined language preference in the document object model, and optimizing the content layout horizontally or vertically as defined in the document object model.

11. A method as in claim 4, wherein transforming the content comprises: removing or converting at least a portion of the content based on applications currently being executed on the mobile device other than a browser rendering the modified content.

12. A method as in claim 4, wherein transforming the content comprises: associating the mobile device with a country, executing pattern recognition to determine a pattern most closely matching the mobile device and country, the pattern having associated rules, and using the rules to transform the mapped content.

13. A method as in claim 4, wherein transforming the content comprises: tagging the modified content to avoid further modification by any intervening servers and/or transcoders between the mobile device and the gateway server.

14. A method as in claim 4, wherein associating the identified subscriber with a corresponding user profile comprising polling a remote repository with identification information characterizing the subscriber to obtain the user profile.

15. A method as in claim 14, wherein the user profile further comprises the second document object model.

16. A method as in claim 4, wherein each document object model comprises a plurality of hierarchically arranged nodes.

17. A method as in claim 16, further comprising identifying a content type associated with each node by executing semantic interpretation of such nodes.

18. A method as in claim 17, wherein the semantic interpretation comprises syntactic pattern recognition.

19. A method as in claim 17, wherein if the rules specify that content associated with a particular node is to be blocked, then the corresponding node is removed from the document object model.

20. A method as in claim 19, wherein children nodes of the removed node are relocated to depend from a different node.

21. A method as in claim 4, wherein the first document object model is selected by conducting pattern matching of the content to one of a plurality of pre-defined document object models and selecting the pre-defined document object model that is the closest match.

22. A non-transitory computer program product storing instructions which, when executed by at least one data processor forming part of at least one computer, result in operations comprising:
receiving content from a content source to be converted, the conversion being associated with a subscriber;
deconstructing the content according to a first document object model;

associating the user with a second document object model and rules for transforming the content according to the second document object model;

transforming the content from the first document object model to the second document object model using the rules to result in modified content; and initiating provision of the modified content to the subscriber.

23. A system comprising:

at least one data processor; and memory storing instructions which, when executed by the at least one data processor, result in operations comprising:

receiving a first request to retrieve content from a content server, the request identifying a subscriber using a mobile device;

associating the identified subscriber with a corresponding user profile, the user profile providing a plurality of rules that define how content is to be displayed;

transmitting a second request to retrieve the content from the content server;

receiving the content from the content server;

parsing the content by:
  deconstructing the content and mapping the deconstructed content to a first document object model, and
  transforming the mapped content according to the plurality of rules defined in the user profile to generate a second document object model; and transmitting the transformed content for rendering on a mobile device.

* * * * *